Jan. 23, 1923.
K. F. FAELCHLE.
BAKING PAN.
FILED AUG. 30, 1920.
1,442,931
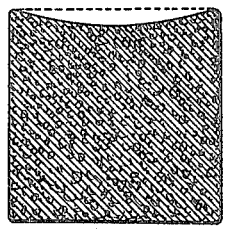
Fig.1.
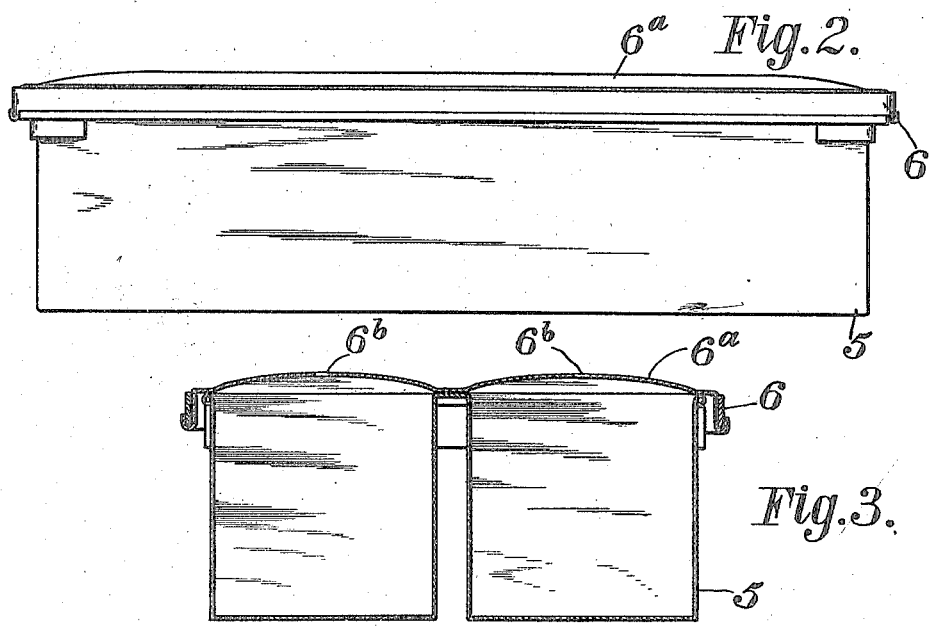
Fig.2.
Fig.3.
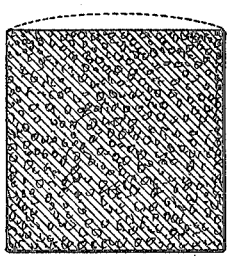
Fig.4.
INVENTOR.
Karl F. Faelchle
BY
his ATTORNEYS Patented Jan. 23, 1923.

1,442,931

UNITED STATES PATENT OFFICE.

KARL F. FAELCHLE, OF COLUMBUS, OHIO.

BAKING PAN.

Application filed August 30, 1920. Serial No. 406,874.

*To all whom it may concern:*

Be it known that I, KARL F. FAELCHLE, a citizen of the United States, residing at Columbus, in the county of Franklin and State of Ohio, have invented a certain new and useful Improvement in Baking Pans, of which the following is a specification.

In the accompanying drawings forming part hereof—

Figure 1 is a cross section of a loaf of sandwich bread substantially as heretofore produced.

Fig. 2 is a side view of a baking pan for baking a sandwich loaf with my improved device added.

Fig. 3 is a cross section of the pan and cover.

Fig. 4 is a cross section of a loaf as produced with my improvement.

Sandwich bread is desirably square in cross section so that when the sandwich is cut diagonally each triangular half appears like the other. Sandwich loaves as now produced almost invariably have a sag in the top such as illustrated in Fig. 1. When a sandwich is made with slices from such a loaf it has been the custom of chefs to trim the slices to more nearly square form, so that upon diagonal cutting the resulting triangles shall be symmetrical and of attractive and appetizing form. This trimming has resulted in an enormous waste and the loss of the most valuable portion of the bread—the crust. The problem that confronted me for a long time was to produce a sandwich loaf by which this loss and trouble is avoided. No skill in the preparation, manipulation or baking of the dough with the pans and covers in common use appears to have been adequate to prevent the sagging of the top. I have solved the problem by employing a pan 5 the body of which is square, as usual, in cross section and of the desired length. Such loaves are usually made quite long. Instead of the flat cover heretofore employed I employ for the pan a cover 6 bulged or arched upward, as shown at 6ª, at its top just sufficiently to allow for the rising of the bread in the ordinary baking of ordinary dough to an extent sufficient to permit the top of the baked loaf to fall or shrink to the level of the top of the pan. In baking the natural or normal tendency of the bread to rise might be to a much greater extent than the space allowed in the bulge, but this tendency to rise is resisted by my cover and the rise limited to substantially the extent stated. The result is that all four of the longitudinal faces of the loaf are planes. As a concrete example of the operation of the device described let it be assumed that the loaf is to be of the standard pound and a half size. In this case the pan is fifteen and three quarters inches long, three and one fourth inches deep and three and three quarters inches wide. Into this pan is placed twenty-six ounces of dough which when baked results in a pound and a half loaf. Without my cover this is the usual practice in baking such a loaf. But when the loaf is baked without my arched cover the loaf produced has a cross section such as shown in Fig. 1. With my invention the bread rises against the cover and its undue rise is resisted, the top being more or less baked and formed with a crust at the cover so that in sinking after baking it falls only to a level with the top of the pan and as illustrated in Fig. 4 thereby producing a prism of bread with all its faces flat. The extent of the fall of the bread is therefore controlled by limiting its rise. As shown in my drawing for baking of ordinary dough an elongated loaf the cover in cross section is bulged outward from the plane of the top of the pan upon substantially the arc of a circle having for its radius a line approximately twice the depth of the pan. To provide for the escape of gases or vapors generated in baking the cover is provided at the top of the bulge with a suitable number of small vents such as shown at 6ᵇ. With this device I have been able to produce many thousands of properly baked sandwich loaves square in cross section or substantially as shown in Fig. 4 where the added broken line indicates the shape the loaf takes at the top in the baking process, and the full lines the shape it assumes after removal from the pan or upon the removal of the cover. Of course, the principle of my invention can be used in baking loaves of other prismatic form and where it is desirable that the faces of the loaf shall be planes, hence the forms of the parts can be varied without departing from the gist of the invention as claimed.

What I claim is:

The combination of an elongated open top pan substantially rectangular in longitudinal section and substantially square in cross section, a removable cover for the pan fitting against the top side edges of the pan and curved upwardly from the edges upon an arc of a circle having a radius approximately twice the depth of the pan.

KARL F. FAELCHLE.